US006889329B1

United States Patent
DiGiorgio et al.

(10) Patent No.: US 6,889,329 B1
(45) Date of Patent: May 3, 2005

(54) ADDING SECURE EXTERNAL VIRTUAL MEMORY TO SMART CARDS

(75) Inventors: Rinaldo DiGiorgio, Easton, CT (US); Stephen Uhler, Los Altos, CA (US); Colin Stevens, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 903 days.

(21) Appl. No.: 09/627,845

(22) Filed: Jul. 28, 2000

(51) Int. Cl.[7] .................................................. G06F 1/24
(52) U.S. Cl. ........................ 713/200; 713/193; 713/201
(58) Field of Search ............................... 713/200, 201, 713/193

(56) References Cited

U.S. PATENT DOCUMENTS

| | | | | |
|---|---|---|---|---|
| 4,575,621 A | * | 3/1986 | Dreifus ........................ | 235/380 |
| 5,193,114 A | * | 3/1993 | Moseley ...................... | 713/183 |
| 5,832,228 A | * | 11/1998 | Holden et al. .............. | 709/225 |

OTHER PUBLICATIONS

*What is a Smart Card,* GEMPLUS—Smart Card Basics, {http://www.gemplus.com/basics/what.htm} (visited Jun. 7, 2000).

Rinaldo Di Giorgio, *An Introduction to the URL Programming Interface,* JavaWorld, Sep. 1999, {http://www.javaworld.com/javaworld/jw–09–1999/f_jw–09–javadev.html} (visited May 9, 2000).

UCL Crypto Group, *CASCADE, A Smarter Chip for Smart Cards,* Smart Card: CASCADE EP 8670, {http://www.dice.ucl.ac.be/crypto/cascade/} (visited Apr. 18, 2000).

* cited by examiner

*Primary Examiner*—Thomas R. Peeso
(74) *Attorney, Agent, or Firm*—Gunnison, McKay & Hodgson, L.L.P.; Philip J. McKay

(57) ABSTRACT

The Smart Card URL Programming interface (UPI) builds a local web or card server around a card terminal and the inserted smart card. This server can also support secure object storage, which stores serialized, secure signed, compressed objects (or applications or data) for delivery to the card or for off-loading from the card. The secure object storage is also web addressable. The object storage program stores objects with the option of signing and/or encrypting and retrieves objects which may require cryptographic credentials. If a user desires to run applications on a card that exceeds the memory capacity of the card, information about the applications, including pointers and their digital signatures, is acquired and stored on the card by the card server. The card server manages the applications on a card and their movement on and off the card.

1 Claim, 4 Drawing Sheets

ADDING SECURE EXTERNAL VIRTUAL MEMORY TO SMART CARDS

BACKGROUND OF THE INVENTION

1. Field of the Invention

The present invention relates generally to computer technology and is concerned with the use of smart cards that can be used to execute programs stored on the cards as a trusted platform. This invention relates to both hardware and software.

2. Background Art

A smart card is the size of a conventional credit card, and contains an electronic microchip. The chip stores electronic data and programs that are protected by security features. There are two types of smart cards, contact and contactless cards. Contact smart cards must be used in conjunction with a smart card reader. When the smart card is inserted into a smart card reader, the reader makes contact with a small gold plate about 0.5 inches in diameter on the front of the card, through which data is transferred to and from the chip. Contactless smart cards are passed near an antenna to carry out a transaction. They have an electronic microchip and an antenna embedded inside. These components allow the card to communicate with an antenna/coupler unit without physical contact.

The size of the card is determined by international standard ISO (International Standards Organization) 7810. The ISO 7810 standard defines the physical characteristics of the card, including position of the electrical contacts and how the microchip communicates with the outside world. A number of standards have also been defined for specific applications, including digital cell phones, credit card functions and electronic purses. The implementation of Java™ on smart cards is also the subject of ongoing standardization work (Javacard version 1 and 2).

There are different types of security mechanisms used in smart cards. Access to the information contained in a smart card is controlled to limit who can access the information (everybody, the card holder or a specific third party) and how can the information be accessed (read only, added to, modified or erased). With regard to access, some smart cards require no password and anyone holding the card can have access. Others limit access to the cardholder only, typically by the use of a password in the form of a PIN (Personal Identification Number) number. If an unauthorized individual tries to use the card, it will lock-up after several unsuccessful attempts to present the correct PIN code. Some smart cards can only be accessed by the party who issued them, as in the case of an electronic purse that can only be reloaded by the issuing bank. Information on a smart card can be divided into information that can only be read, information that can only be added, information that can only be updated and information with no access available.

A smart card can restrict the use of information to an authorized person with a password. However, if this information is then transmitted by radio or telephone, additional protection is necessary. One form of protection is encryption or the use of a code. Some smart cards are capable of encryption and decryption so the stored information can be transmitted without compromising confidentiality. This authentication process ensures only genuine cards are used and makes eaves-dropping more difficult.

Some smart cards, with microprocessors and memory, have the ability to execute customized application programs. For such applications, the security of the card and its tamper resistance are of great concern. Smart cards can be used to provide additional security for applications by providing a secure tamper resistant store (or storage area) for data. Issuers of smart cards want to use the smart card memory for execution of programs because the smart card is a trusted environment.

One of the limitations of smart cards arises from their limited memory capacity. Current cards typically only have a few thousand bits of memory for user applications. Consequently, applications running on smart cards always tend to run out of memory. There is a need for a way to extend the memory availability of smart cards to accommodate various applications.

SUMMARY OF THE INVENTION

In one or more embodiments of the invention, a Smart Card URL Programming interface (UPI) builds a local web or card server around a card terminal and the inserted smart card. This server can also support secure object storage, which stores serialized, secure signed, compressed objects (or applications or data) for delivery to the card or for off-loading from the card. The secure object storage is also web addressable, so that a user needs only one storage area that can be on the Internet and accessed from all locations. The object storage program stores objects with the option of signing and/or encrypting and retrieves objects which may require cryptographic credentials.

If a user desires to run applications on a card that exceed the memory capacity of the card, information about the applications, including pointers and their digital signatures, is acquired and stored on the card by the card server. The card is thus provided with basic information about the nature of the applications that are authorized for use on the card at the time that the card is first loaded. The applications on a card and their movement on and off the card are managed by the card server. Applications on a card can be moved off to secure storage and applications in secure storage can be moved to the smart card. Data on a card can be moved to secure storage and data in secure storage can be moved to the card securely.

DETAILED DESCRIPTION OF THE INVENTION

A method and apparatus for adding secure external memory to smart cards is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 5:
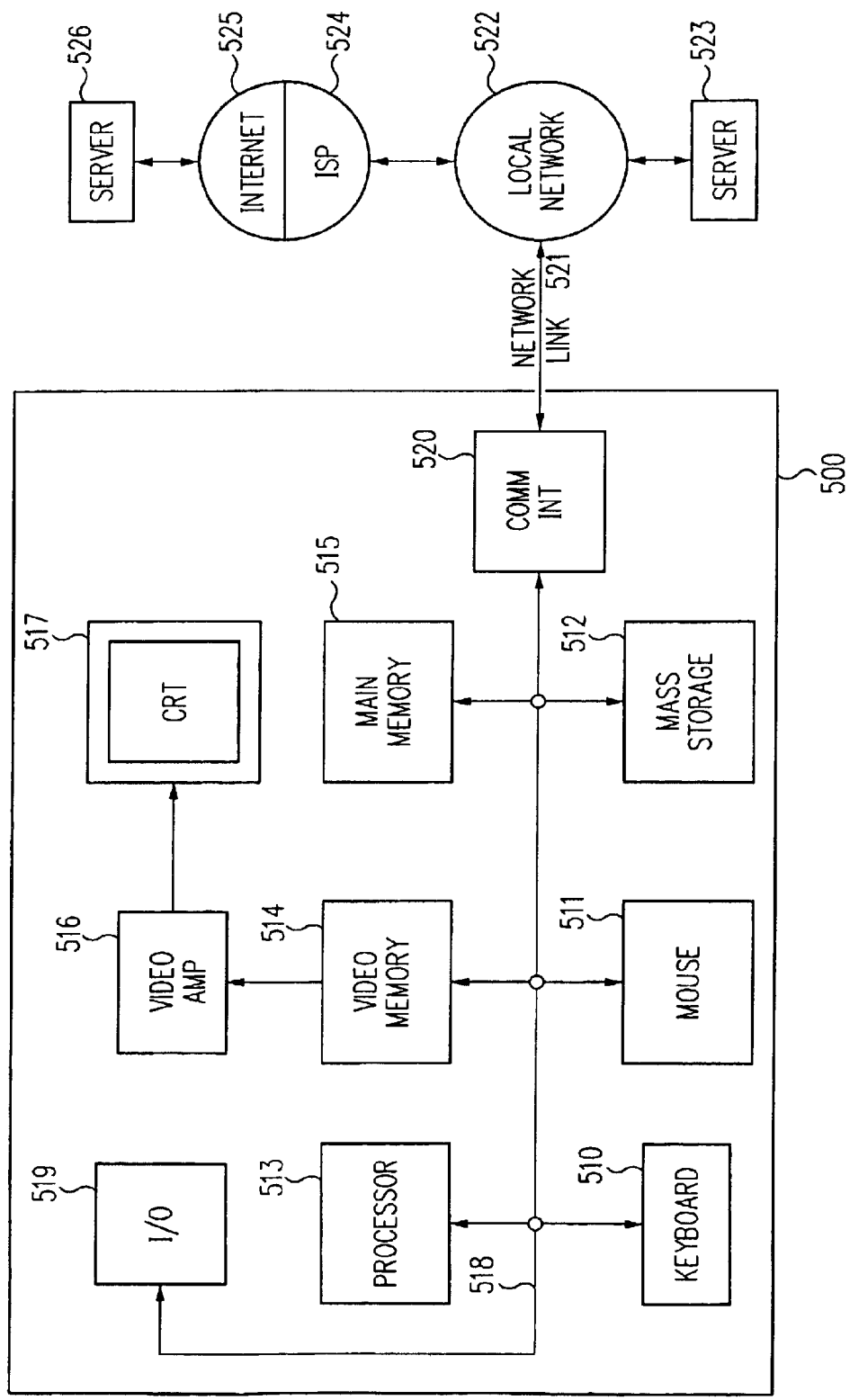
FIG. 5 illustrates an example of a general-purpose computer that can be used to implement an embodiment of this invention as computer software in the form of computer readable program code.

An embodiment of the invention can be implemented as computer software in the form of computer readable program code executed on one or more general-purpose computers such as the computer 500 illustrated in FIG. 5. A keyboard 510 and mouse 511 are coupled to a bi-directional system bus 518 (e.g., PCI, ISA or other similar architecture). The keyboard and mouse are for introducing user input to the computer system and communicating that user input to central processing unit (CPU) 513. Other suitable input devices may be used in addition to, or in place of, the mouse 511 and keyboard 510. I/O (input/output) unit 519 coupled to bi-directional system bus 518 represents possible output devices such as a printer or an A/V (audio/video) device.

Computer 500 includes video memory 514, main memory 515, mass storage 512, and communication interface 520. All these devices are coupled to a bi-directional system bus 518 along with keyboard 510, mouse 511 and CPU 513. The mass storage 512 may include both fixed and removable media, such as magnetic, optical or magnetic optical storage systems or any other available mass storage technology. The system bus 518 provides a means for dressing video memory 514 or main memory 515. The system bus 515 also provides a mechanism for the CPU to transfer data between and among the components, such as main memory 515, video memory 514 and mass storage 512. In one embodiment of the invention, the CPU 513 is a microprocessor manufactured by Motorola, such as the 650×0 processor, an Intel Pentium III processor, or an UltraSparc processor from Sun Microsystems. However, any other suitable processor or computer may be utilized. Video memory 514 is a dual-ported video random access memory. One port of the video memory 514 is coupled to video accelerator or video amplifier 516. The video accelerator device 516 is used to drive a CRT (cathode ray tube), and LCD (Liquid Crystal Display), or TFT (Thin-Film Transistor) monitor 517. The video accelerator 516 is well known in the art and may be implemented by any suitable apparatus. This circuitry converts pixel data stored in video memory 514 to a signal suitable for use by monitor 517. The monitor 517 is a type of monitor suitable for displaying graphic images.

The computer 500 may also include a communication interface 520 coupled to the system bus 518. The communication interface 520 provides a two-way data communication coupling via a network link 521 to a network 522. For example, if the communication interface 520 is a modem, the communication interface 520 provides a data communication connection to a corresponding type of telephone line, which comprises part of a network link 521. If the communication interface 520 is a Network Interface Card (NIC), communication interface 520 provides a data communication connection via a network link 521 to a compatible network. Physical network links can include Ethernet, wireless, fiber optic, and cable television type links. In any such implementation, communication interface 520 sends and receives electrical, electromagnetic or optical signals, which carry digital data streams representing various types of information.

The network link 521 typically provides data communication through one or more networks to other data devices. For example, network link 521 may provide a connection through local network 522 to a host computer 523 or to data equipment operated by an Internet Service Provider (ISP) 524. ISP 524 in turn provides data communication services through the world wide packet data communication network now commonly referred to as the "Internet" 525. Local network 522 and Internet 525 both use electrical, electromagnetic or optical signals that carry digital data streams to files. The signals through the various networks and the signals on network link 521 and through communication interface 520, which carry the digital data to and from computer 500, are exemplary forms of carrier waves for transporting the digital information.

The computer 500 can send messages and receive data, including program code, through the network(s), network link 521, and communication interface 520. In the Internet example, server 526 might transmit a requested code for an application program through Internet 525, ISP 524, local network 522 and communication interface 520.

The computer system described above is for purposes of example only. An embodiment of the invention may be implemented in any type of computer system or programming or processing environment.

Smart cards are of interest because they can be used to provide additional security for applications and data by providing a secure, tamper resistant storage area for applications and data. The memory that can be placed on a smart card is limited and, consequently, applications using smart cards tend to run out of memory. There is a need for a way to extend the memory available to smart cards (and other portable device with limited memory capacity) to accommodate various applications. In order to run applications in the memory of a smart card, identifiers must be provided to locate the desired applications or data from another source that might be a network or any other location where data can be stored. In one embodiment of this invention, a URL (Uniform Resource Locator) Programming Interface (UPI) is used to provide identifying information to identify and locate applications and data. The URL Programming Interface will now be discussed in greater detail for one embodiment of this invention.

Developing consistent, reliable Web applications that interface to different devices—such as home networks, home automation systems, or real-time process control devices—may be simplified by treating devices as URLs. The URL programming interface (UPI) provides a set of URLs for a device that are available to any application capable of performing the HTTP (HyperText Transfer Protocol). HTTP has become so universal that in college computer courses students are often given as an assignment the creation of an HTTP stack. This trend is due to the growing interest in connecting devices to the Internet. Sun Microsystems Laboratories has used the Java™ language to develop a technology that allows users to deploy very small HTTP stacks, with a core of less than 100 KB. However, the claimed invention can be practiced using any computer programming language.

These small HTTP servers can be run on any embedded device or used as application servers that are similar to traditional Web servers. Such minimal servers provide an integrated presentation and service layer for a device. Because a Web server answers URL requests, universal access to devices from any Internet node is achieved. UPI provides an interface to allow applications, including web applications, to access any device as if the device is a file resident on a web server, if the device can perform the HTTP protocol.

The UPI architecture, at its core, consists of a series of handlers that are similar to servlets, but have fewer features. These handlers are mapped to incoming URL requests. This allows the UPI function on very small devices, such as a TINI board. The UPI supplies handlers for web services such as file service and CGI script execution. Application developers can develop handlers for Internet aware devices (IADs) simply by coding a few required methods, such as init and respond, along with code that understands the applicable device grammar.

Figure 1:
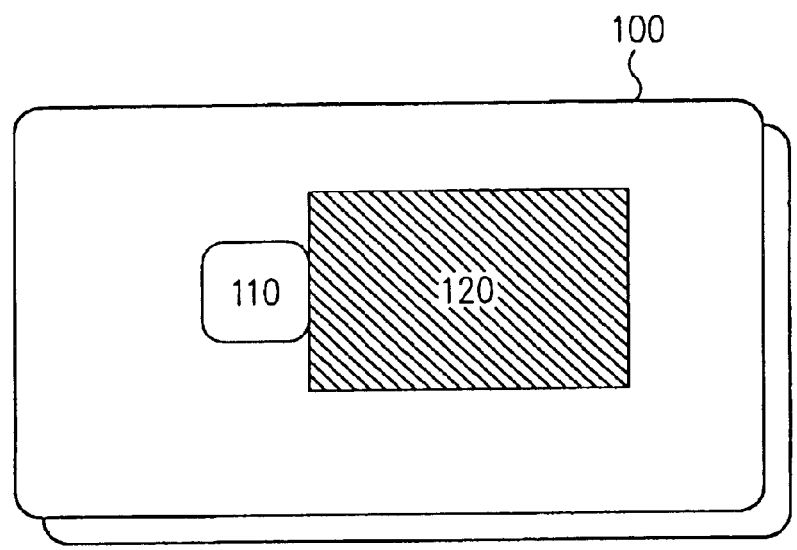
FIG. 1 illustrates some of the features of an embodiment of a smart card.

FIG. 1 illustrates some of the features of one embodiment of a smart card. In FIG. 1, smart card 100 includes a contact 110 to transfer information to a smart card reader and an electronic microchip 120. As discussed earlier, applications running on smart cards tend to have a limited memory capacity. There is a need for a way to extend the memory available to smart cards to accommodate various applications. For example, in a credit card environment, a user may wish to maintain accounts with a dozen or more vendors, such as airlines, car rental companies and hotel chains and use his smart card as a means of payment at all of them. This usage requires considerably more memory than a typical smart card has available. The smart card may have the capability of storing data for several accounts, but not for a dozen accounts. In order to extend the memory capability of a smart card to accommodate such applications, a secure virtual paging system is implemented for data and instructions, or programs, in this invention. Instructions are additional programs and data refers to additional personal/corporate information like the birthdays of people or all the access mechanisms for controlled web sites.

Figure 2:
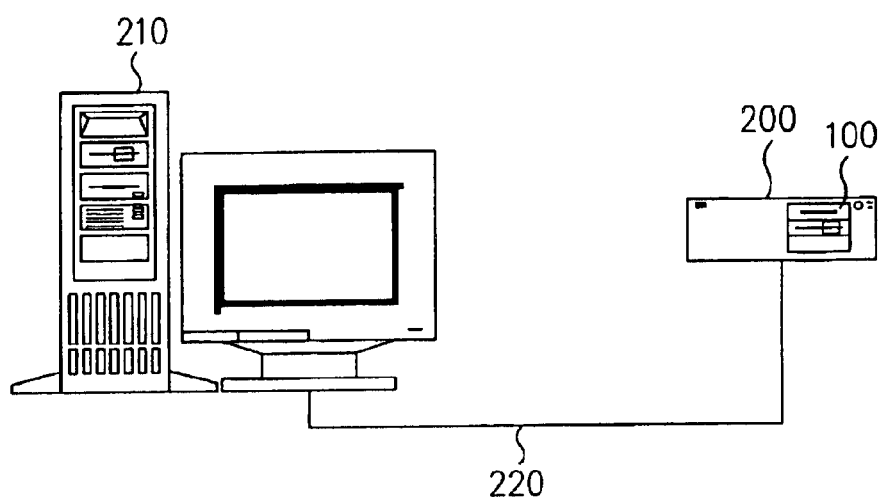
FIG. 2 illustrates some of the components of an embodiment of a smart cart server and smart card reader/writer terminal.

In this invention, the Smart Card URL (Uniform Resource Locator) Programming Interface (UPI) builds a local web or card server around a card terminal and the inserted smart card. FIG. 2 illustrates some of the components of an embodiment of a smart cart server and smart card reader/writer terminal. In FIG. 2, smart card 100 is shown in the smart card reader 200 connected by a cable 220, or in some other way, to card server 210. This server can also support secure object storage, which stores serialized, secure, signed, compressed objects for delivery to the card or for off-loading from the card. The secure object storage is also web addressable, so that a user needs only one storage area that can be on the Internet and accessed from all locations. These operations are performed by an object storage program that stores an object with the option of signing and or encrypting and retrieves an object which may be encrypted.

If a user desires to run a number of applications on a card that exceeds the card's memory capacity, information about the applications, including identifiers or pointers and their digital signatures, is acquired and stored on the smart card by the card server. The card is thus provided with basic information about the nature of the applications that are authorized for use on the card at the time that the card is first loaded. The card server may manage the applications on a card and their movement on and off the card. However, the invention contemplates the use of any other component configured to manage the movement of such applications. Applications on a card can be moved off to secure storage and applications in secure storage can be moved to the smart card. Data on a card can be moved to secure storage and data in secure storage can be moved to the card securely. However, the applications (e.g., computer readable program code) can also be stored in a non-secure environment or an environment having limited security.

Data or authorized applications in secure storage may be signed using a signature algorithm, such as DSS (Digital Signature Standard, a National Institute of Standards and Technology proposed standard for digital signatures using a public key digital signature algorithm) or a custom solution using SHA-1 (Secure Hash Algorithm 1, a hash algorithm developed by the National Institute of Standards and Technology and the National Security Agency). The secret key for the storage is recorded on the card and all signing operations are performed on the smart card. Typically these objects are small, so that all encryption and decryption operations are also performed on the card. This invention allows trusted code to be always run on the card. The invention manages applications on the cards and performs encryption and decryption while loading and unloading data and program segments. The smart card is tamper resistant and the card participates in signing the applications so that the security for the system resides in the smart card. Applications intended for use may be routed through the card which signs them before they are stored at the secure storage area.

The card is provided with a look up table (e.g., a series of pointer) that contains the name of the application, the location in the form of a URL and a checksum. A checksum, or hash, is a count of the number of bits in a transmission unit so that the recipient can make sure the correct number of bits arrived and that the message is intact. When the user wants applications, the card server obtains the applications and records them on the card if the card is authorized to use them. The card server (or some other component) allows the application to execute on the card if it passes the required verification. This system avoids the need of having to go to the application's manufacturer to load an application on the card. It is possible to have a personal library for the card stored for use as needed on the card server. Any card reader that is network enabled with the appropriate technology (e.g., UPI) can fetch and load applications transparently to the user. Applications can be ranked according to frequency of use for faster operation.

Figure 3:
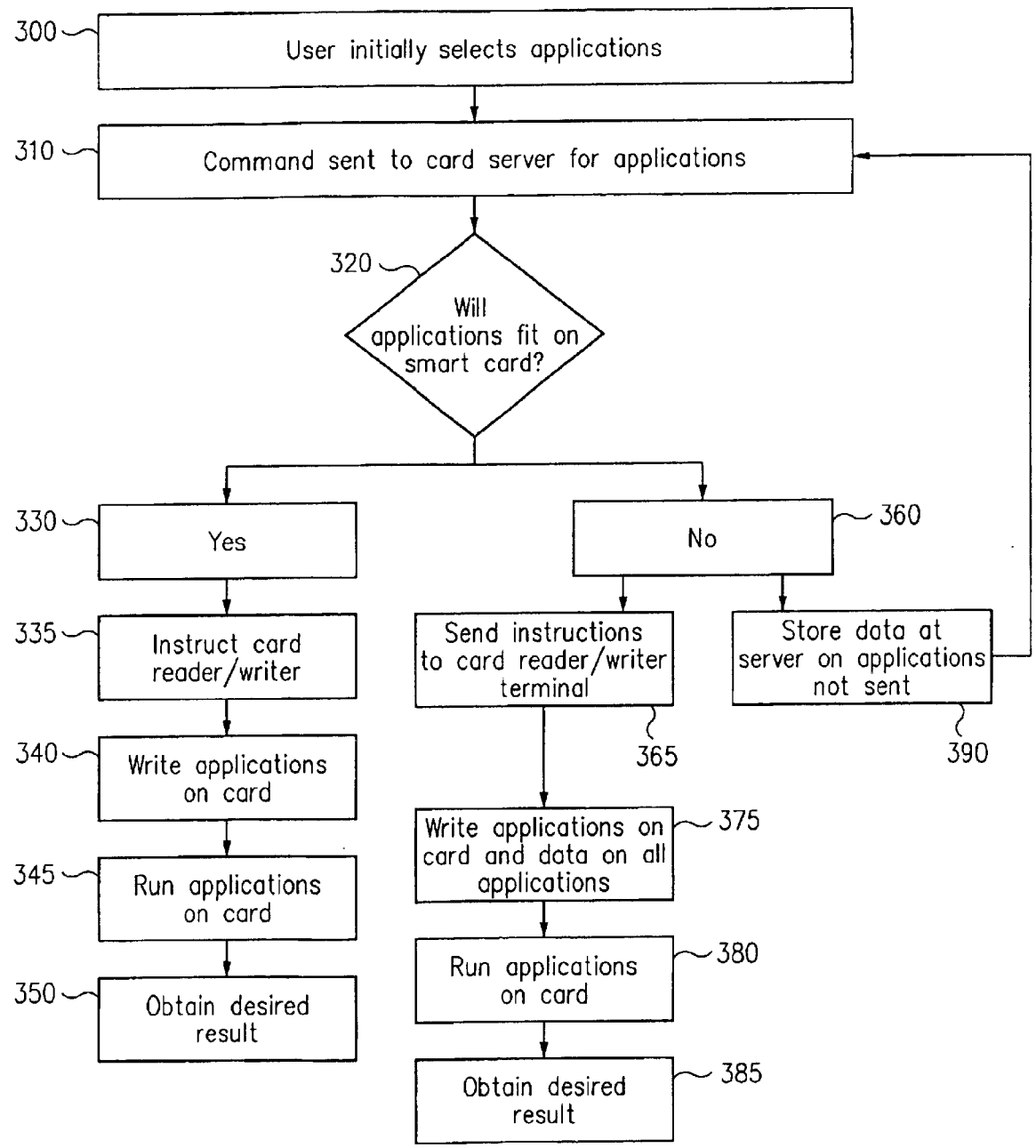
FIG. 3 illustrates some of the steps of an embodiment of the process for placing applications on a smart card initially.

FIG. 3 illustrates some of the steps of the process for placing applications on a smart card initially in one embodiment of this invention. In FIG. 3, the user initially selects the applications desired at step 300 and their priority for placement on the smart card. A command is sent to the card sever to process the selected applications at step 310. At step 320, the card server determines if the applications selected will fit within the memory constraints of the smart card. If the applications selected will fit on the smart card, the process proceeds to step 330 and then to step 335 where instructions are issued to the smart card reader/writer terminal to write the applications on the card at step 340. At step 345, the user runs the selected applications on the smart card and obtains the desired result 350.

If the applications selected will not fit on the smart card, the process proceeds to step 360 and then to step 365. At step 365, instructions are issued to the smart card reader/writer terminal that will be later written on the smart card. These instructions include (1) notice that only some applications can be placed on the smart card, (2) identification of all selected applications that will eventually be used together with authorizations for their use and (3) the applications that will be written on the card initially. At step 375, the smart card reader writer terminal writes all of this information on the smart card. At step 380, the user runs the selected applications on the smart card and obtains the desired result 385. At the same time that step 365 is being processed, the selected applications that cannot be written on the smart card, due to memory constraints, are stored on the secure card server at step 390.

Figure 4:
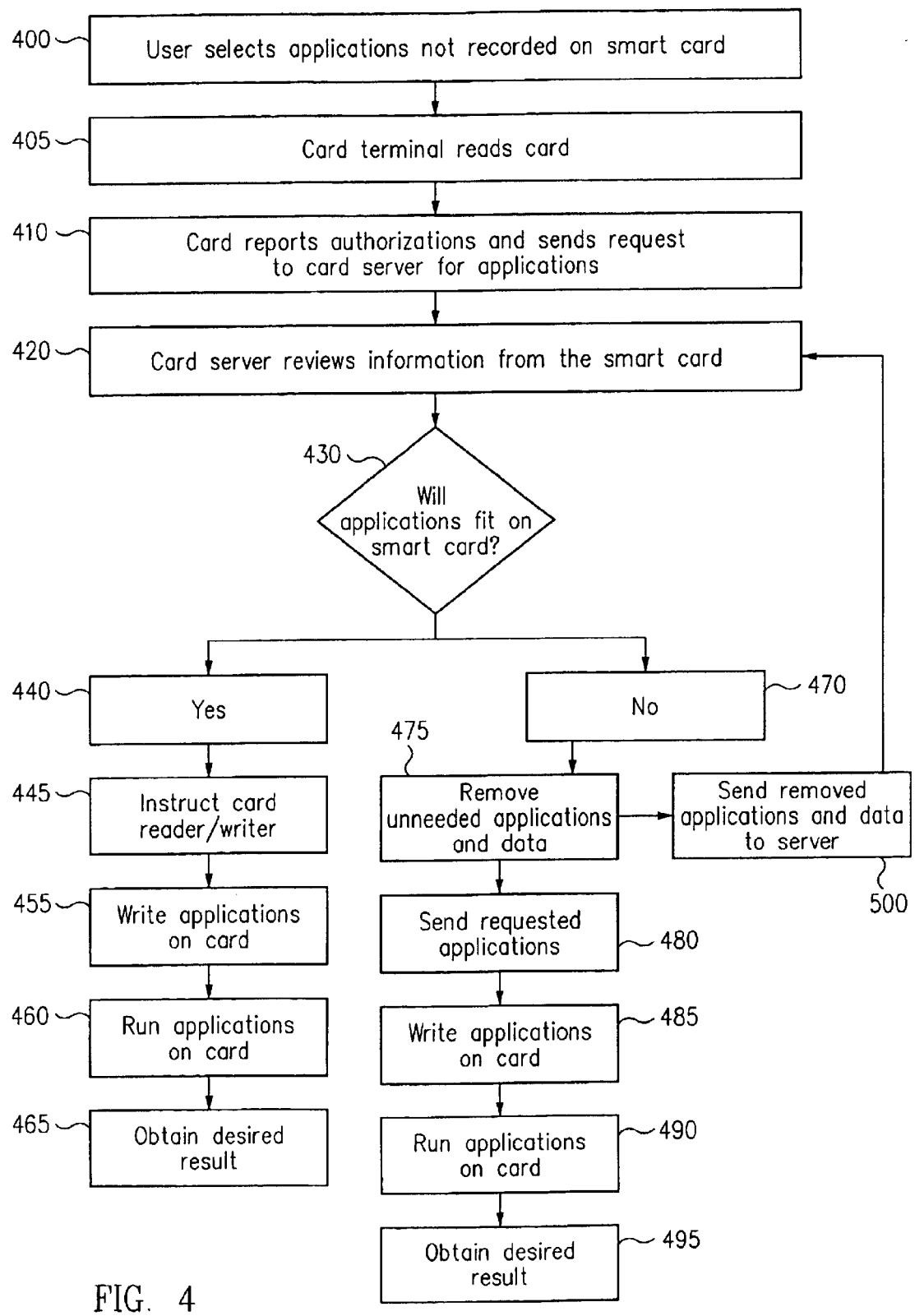
FIG. 4 illustrates some of the steps of an embodiment of the process for removing and replacing applications on a smart card.

FIG. 4 illustrates some of the steps, in one embodiment of this invention, of the process for removing and replacing some of the applications on a smart card that was loaded with applications earlier, as described in the discussion of FIG. 3. In FIG. 4, the user selects applications that have been authorized, but not recorded, on the smart card at step 400. At step 405, the terminal communicates with the smart card to determine authorized applications. At step 410, the smart card uses information recorded on the smart card at the time of initial use, identifying applications that eventually would be needed and are authorized for use. The smart card reports this information back to the card server requesting transmission of the applications. The card sever examines the request from the smart card and determines whether to process the selected applications for placement on the smart card at step 420. At step 430, the card server determines if the applications selected will fit within the memory constraints of the smart card. If the applications selected will fit on the smart card, the process proceeds to step 440 and then to step 445 where instructions are issued to the smart card reader/writer terminal to write the applications on the card at step 455. At step 460, the user runs the selected applications on the smart card and obtains the desired result 465.

If the applications selected will not fit on the smart card, the process proceeds to step 470 and then to step 475. At step 475, instructions are issued to the smart card reader writer terminal to remove unneeded applications and data. These are sent to the card server at step 500 for secure storage where they can be retrieved later by the smart card. Other applications that will be needed later that will not fit on the smart card are also sent in step 500 to the card server for secure storage. At step 480, the smart card reader/writer terminal is sent information on the requested applications. At step 485, the smart card reader/writer terminal writes all of this information on the smart card. At step 490, the user runs the selected applications on the smart card and obtains the desired result 495.

In the event that the user selects applications that have not been previously authorized, then access to these applications will be declined and the user will have to repeat the process described in FIG. 3 in order to obtain the new applications.

What is claimed is:

1. A method for adding external memory to a smart card comprising:

storing information required by a smart card on a smart card server;

transferring data comprising applications for processing on said smart card and authorizations and encryption keys for other applications from said smart card server through a cable to a smart card terminal capable of reading and writing to said smart card;

transferring said data from said smart card terminal to said smart card through an electrical contact on said smart card;

storing said data on said smart card for processing on said smart card;

processing said data on said smart card for a user;

issuing a request for additional applications as need by said user for transfer to said smart card together with encryption keys;

authentication and authorization of said request by said smart card server using data on said smart card;

issuing instructions from said smart card server to said smart card terminal to remove unneeded applications and transfer new authorized applications to said smart card; and processing said applications on said smart card for said user.

* * * * *